US010874902B1

(12) United States Patent
Near

(10) Patent No.: US 10,874,902 B1
(45) Date of Patent: Dec. 29, 2020

(54) INTELLIGENT SPORTS EQUIPMENT SYSTEMS AND METHODS

(71) Applicant: Helios Hockey, Inc., Portsmouth, NH (US)

(72) Inventor: William G. Near, Portsmouth, NH (US)

(73) Assignee: Helios Hockey, Inc., Portsmouth, NH (US)

( * ) Notice: Subject to any disclaimer, the term of this patent is extended or adjusted under 35 U.S.C. 154(b) by 0 days.

(21) Appl. No.: 16/529,349

(22) Filed: Aug. 1, 2019

Related U.S. Application Data

(60) Provisional application No. 62/713,143, filed on Aug. 1, 2018.

(51) Int. Cl.
| | |
|---|---|
| *A63F 9/24* | (2006.01) |
| *A63B 24/00* | (2006.01) |
| *A63B 43/00* | (2006.01) |
| *A63B 67/14* | (2006.01) |
| *G06K 7/10* | (2006.01) |
| *A63B 71/06* | (2006.01) |
| *A63B 102/24* | (2015.01) |
| *A63B 102/22* | (2015.01) |
| *A63B 102/14* | (2015.01) |
| *A63B 69/00* | (2006.01) |

(52) U.S. Cl.
CPC ........ *A63B 24/0021* (2013.01); *A63B 43/004* (2013.01); *A63B 67/14* (2013.01); *A63B 71/0622* (2013.01); *G06K 7/10297* (2013.01); *A63B 69/0024* (2013.01); *A63B 2024/0028* (2013.01); *A63B 2071/0694* (2013.01); *A63B 2102/14* (2015.10); *A63B 2102/22* (2015.10); *A63B 2102/24* (2015.10); *A63B 2220/13* (2013.01); *A63B 2220/30* (2013.01); *A63B 2220/40* (2013.01); *A63B 2220/53* (2013.01); *A63B 2220/833* (2013.01); *A63B 2225/54* (2013.01)

(58) Field of Classification Search
CPC .......... A63B 2225/54; A63B 2225/833; A63B 2225/40; A63B 2220/833; A63B 2220/40
See application file for complete search history.

(56) References Cited

U.S. PATENT DOCUMENTS

| | | | | |
|---|---|---|---|---|
| 2010/0184563 | A1* | 7/2010 | Molyneux | A43B 3/0005 482/1 |
| 2013/0073248 | A1* | 3/2013 | Perkins | A63B 53/14 702/141 |
| 2014/0209691 | A1* | 7/2014 | Finn | G06K 19/07794 235/492 |
| 2015/0054632 | A1* | 2/2015 | Ben Ezra | H04Q 9/00 340/323 R |

* cited by examiner

*Primary Examiner* — Omkar A Deodhar
*Assistant Examiner* — Eric M Thomas
(74) *Attorney, Agent, or Firm* — Ascentage Patent Law, LLC; Travis Lee Johnson

(57) ABSTRACT

An intelligent sports equipment system and method for processing data as a result of different types of events associated with a puck or ball and generally another piece of sports equipment. The information associated with each type of event can include associating player information with the processed data. In one example a smart hockey puck has embedded electronics for sensing motion across a plurality of axes, a hockey stick has an associated RFID tag that can be read by the smart hockey puck, which can transmit information to a computing device for displaying processed data.

25 Claims, 15 Drawing Sheets

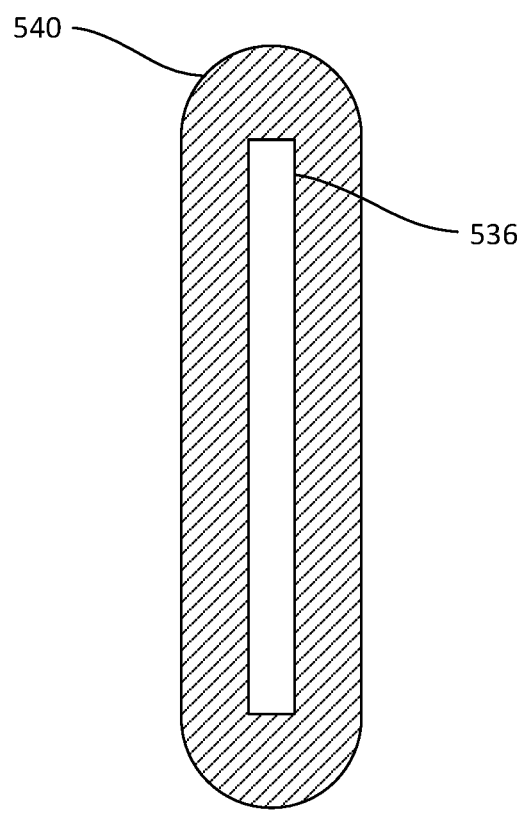
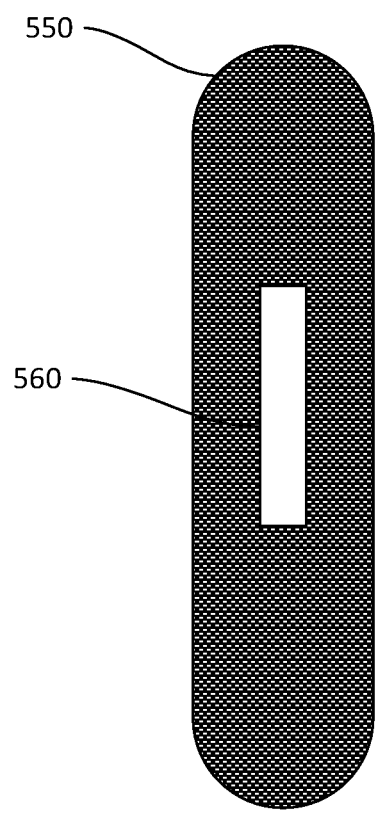
FIG. 5C
FIG. 5D

600

INTELLIGENT SPORTS EQUIPMENT SYSTEMS AND METHODS

CROSS-REFERENCE TO RELATED APPLICATIONS

This application claims the benefit of U.S. Provisional Patent Application No. 62/713,143 filed on Aug. 1, 2018; which is herein incorporated by reference in entirety.

FIELD OF THE INVENTION

The present invention relates generally to the tracking and analysis of various information associated with sports such as ice hockey, field hockey and lacrosse including how a player handles a puck/ball and a stick.

BACKGROUND OF THE INVENTION

One of the current ways to track the speed of a hockey puck is to use a laser or radar gun that is laid out on the ice. These current methods are limited as to the amount of information that can be obtained when a player hits a hockey puck and can also be cumbersome to setup. The present application seeks to advance such methods and systems to better track information associated with the speed and handling of a hockey puck by a given player, as well as analyze said information.

SUMMARY OF THE INVENTION

The present application relates an intelligent sports system comprising a smart puck or smart ball having an electronics board embedded therein. The electronics board includes a processing unit, memory, a plurality of sensors for detecting motion along one or more axes, and at least one antenna. A smart stick or smart racket having an RFID tag associated therewith. The electronics board of the smart puck or smart ball is configured to read information from the RFID tag and further process motion data associated with the smart puck or smart ball.

The intelligent sports system can also include a computing device, such as a smartphone or tablet, for receiving and displaying the processed data associated with the smart puck or smart ball.

The intelligent sports system can further be configured to include a remote or cloud-based server that can receive, store and process received data directly or via the computing device.

The smart puck or smart ball can include a rechargeable battery associated with the electronics board that can be charged using an external charging device.

The embedded electronics board can measure, process, and transmit information from a plurality of sensors including acceleration, velocity, position, orientation, jerk, rotational velocity, rotational acceleration, rotational position, temperature, serial number, player identification, and battery level of the device.

The embedded electronics board can further include wireless transceivers and communication protocol (i.e. Bluetooth, BLE, RFID, NFC) to transmit information from the smart puck or smart ball to another computing device (i.e. mobile device, computer, hockey stick, charging source), and oppositely, to receive information from another computing device to the smart puck or smart ball (i.e. hockey stick, player identification, mobile device, computer, charging source).

In one embodiment the electronics board is configured to have an idle state and an active state. The active state can be initiated upon movement of the smart puck or smart ball or when in close proximity to and detecting of the smart stick or smart racket.

The smart stick or smart racket can have a plurality of RFID tags associated therewith and placed in positions along the various surfaces where interaction with the smart puck or smart ball is likely to occur. These RFID tags can also be embedded within the smart stick or smart racket. In one embodiment the smart stick is smart hockey stick and three RFID tags are placed along the front portion of the blade portion of the smart hockey stick.

The smart puck or smart ball can be configured to read each of the plurality of RFID tags. This reading of RFID tags can also determine in part the relative portion or position of the smart stick or smart racket the smart puck or smart ball came in contact with or near to.

The event of the smart puck or smart ball coming in close proximity with the smart stick or smart racket can trigger the electronics board to associate information associated with the RFID tag with the stick or racket data along with processed motion data of the smart puck or smart ball. This information can further be associated with a player profile for viewing and analysis.

In some embodiments a second antenna is provided on the electronics board for transmitting processed motion data wirelessly to a computing device, while the first antenna is used for reading information from RFID tags.

In some embodiments an identification tag can be disposed on the smart stick or smart racket, wherein the identification tag provides information associated with the one or more RFID tags located on or within the smart stick or smart racket. The identification tag can include a barcode, a QR code, an alpha-numeric code, a wireless transmitter, such as a Bluetooth tile or another RFID tag.

The identification tag can be scanned by a computing device and associate the information from the identification tag with a player profile.

RFID tags can be placed on the front and back portions of the blade portion of a smart hockey stick.

The RFID tag can be a multi-layered label comprising an adhesive layer, a ferrite layer, a RFID inlay layer, and a cover or padding layer.

In some embodiments a ferrite layer is coated around a blade portion of the smart stick and the multi-layered RFID label can be comprised of an adhesive layer, an RFID inlay layer, and a cover or padding layer.

A method for tracking information about a puck or ball in an intelligent sports system can include the steps of: providing a puck or ball having an electronics board embedded therein, wherein the electronics board includes a processing unit, a memory, a plurality of sensors, and at least one antenna; providing a stick or racket having an RFID tag associated therewith, wherein the electronics board of the puck or ball is configured to receive information from the RFID tag; determining whether the puck or ball is in close proximity to the RFID tag; and receiving the information from the RFID tag when it is determined that puck or ball is in close proximity to the RFID tag;

This method can further include processing data generated by any sensor the plurality of sensors or information received from the RFID tag.

The method can also include detecting a triggering event by at least one sensor of the plurality of sensors. The detecting event can be one of: motion, acceleration, impact, change in direction of the puck or ball, proximity to stick or racket, or timing event, such as pre-determined time limit, or time of day.

The method can include setting the electronics board to an idle state until another triggering event is detected.

The present device and methods can apply to an ice hockey, field hockey, lacrosse and other sports utilizing a puck or ball and an additional piece of sports equipment such as a stick or racket.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-D illustrate various embodiments of applying or embedding RFID tags and associated layers in or about the blade portion of a hockey stick;

DETAILED DESCRIPTION OF THE INVENTION

As noted in the background section, one of the purposes of the present embodiments is to provide intelligent sports equipment systems and methods that function like real sports equipment and can process data in real-time, without the need for bulky or cumbersome techniques, such as placing a radar or laser gun in a certain part of a hockey rink to determine the speed of the hockey puck. Such previous methods are limited in the amount of information that is provided and the scope about which information can be provided. For example, it is not feasible to place radar or laser gun on the ice rink during live action as multiple players are constantly skating around, and thus triggering or crossing the radar or laser gun fields making it very difficult to determine whether the puck or player crossed over. It is one thing to track the speed of a hockey puck from a single player shooting on goal, but in order to track that in live action using current technology is difficult. This applies to other sports such as field hockey and lacrosse, but the applications can be implemented beyond these mentioned types of sports games. Thus, the present systems and methods were developed to solve these and other problems in current tracking and analysis technology.

For purposes of the embodiments described herein the term processing with respect to the electronic boards and circuitry can include: running calculations on data, recording data, logging data, analyzing data, and receiving or transmitting data. The term RFID tags can be interchanged with RFID chips, RFID transceivers, and RFID transmitters. The terms puck or ball are meant to be a subset of a variety of sports equipment, for example ball can refer a number of types and styles of balls used in sports. The terms stick or racket are also meant to be a subset of a variety of sports equipment, for example stick can refer to hockey stick, field hockey stick, lacrosse stick, baseball bat, and so forth.

Figure 1:
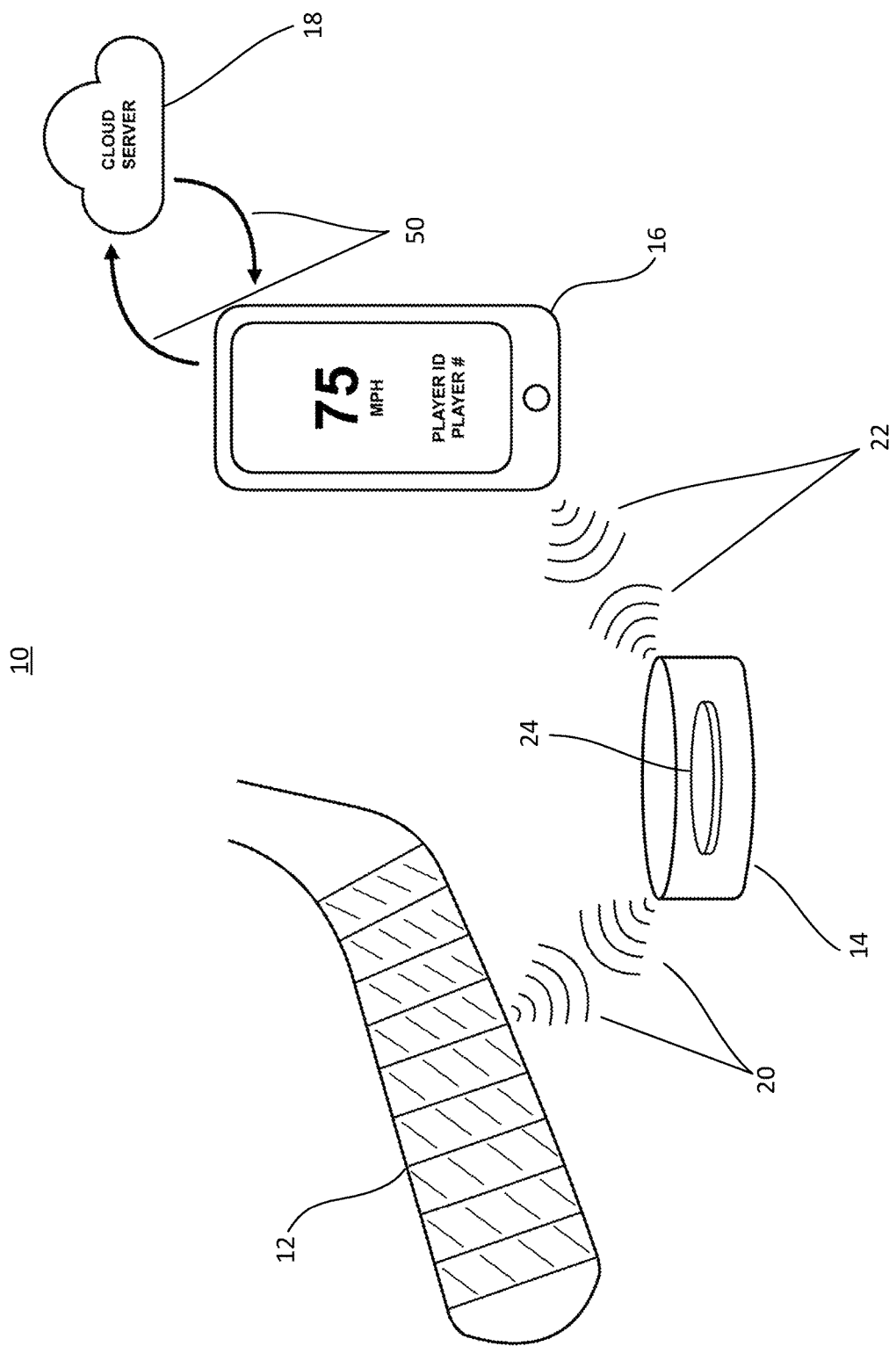
FIG. 1 illustrates a smart hockey puck system.

FIG. 1 illustrates an embodiment of a smart hockey puck system 10 which is comprised of hockey stick 12 having associated RFID transceiver(s), smart hockey puck 14, computing device 16, and remote or cloud-based server 18. One or more RFID tags can be attached to a portion of the blade of hockey stick 12. This allows for certain amount of wireless communication 20 between the hockey stick 12 and the smart hockey puck 14. For example, when the smart hockey puck 14 comes within proximity of or contact with the hockey stick, the smart hockey puck can register that it is within a certain proximity of a particular hockey stick. As further shown in FIG. 1, smart hockey puck 14 can also wirelessly communicate 22 with a computing device 16, such as a smartphone, tablet, smartwatch, laptop, desktop and the like. Depending on computing power, data and so forth, the computing device 16 can transfer via network 50 information to be processed on a remote server or cloud-based server 18. Resulting and historical information can then be relayed back to the computing device 16 and displayed in various formats for further analysis. Such information can be valuable for players, coaches, scouts and so forth.

As mentioned above, the registering event can trigger a processing event in the smart hockey puck 14, which information can be relayed through computing device 16 to be processed and stored in the cloud 18 for later retrieval by computing device 16. For example, if player #99 associated with a unique-identified hockey stick stops the smart hockey puck, the smart hockey puck 14 can record that player #99 has just stopped the smart hockey puck or alternatively can register that the next set of actions associated with the smart hockey puck 14 are to be associated with player #99 and trigger the smart hockey puck to record and associate the next set of actions (data) with player #99's profile. If after player #99 stops the smart hockey puck, he/she then takes a slapshot, the impact, speed, timing, rotation, direction and other recordable data associated with the smart hockey puck can then be processed and associated with player #99's profile. If the smart hockey puck is then recovered by player #88, who is associated with another unique-identified hockey stick, the smart hockey puck can then register and begin processing the next set of data to be associated with player #88's profile. This example extends to other interactions between smart hockey puck 14 and hockey stick 12 including shooting, stickhandling, passing and so forth.

Figure 2:
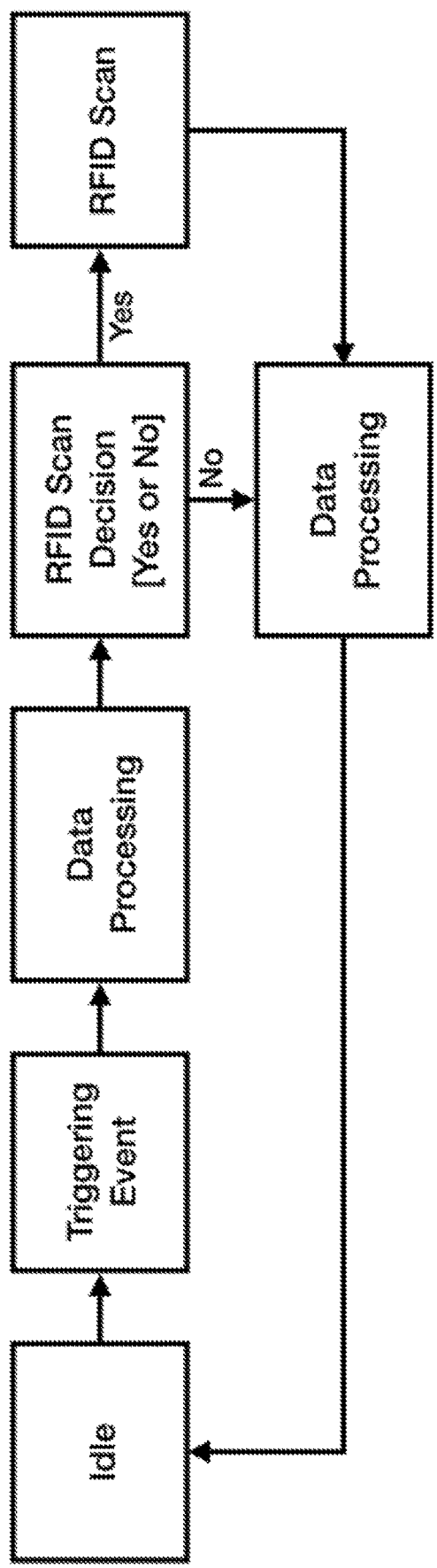
FIG. 2 illustrates a flow chart of processing data associated with a smart hockey puck.

There are multiple actions that can trigger data associated with the smart hockey puck to be processed. FIG. 2 illustrates one method having a set of triggering events and the associated processing of data as a result of the triggering event. The flow chart shown illustrates the smart hockey puck initially in an idle state. The idle state can be a low-power or sleep state where only a limited number of sensors or transmitters are operating until a triggering event occurs, often used to conserve battery life, which upon triggering can turn on additional sensors and transmitters associated with the smart hockey puck. In this flow chart, when motion is detected the smart hockey puck changes from an idle state to an active state, where data is processed. This processed data can be used to calculated performance metrics, be recorded, transmitted or alternatively can simply be tracked until another triggering event occurs. Further in the flow chart a decision box illustrates whether an RFID scan is to occur. In other words, should the smart hockey puck begin scanning for nearby RFID tags or should the smart hockey puck simply continue processing data. If a RFID scanning event is triggered and a nearby RFID tag is detected, then data processing can now be associated with the information associated with that RFID tag as mentioned above, which can include data processing before and/or after the RFID scanning event. At the end of the data processing the smart hockey puck can return again to an idle state, waiting for a new triggering event to occur.

The smart hockey puck can operate in a variety of modes, as one skilled in the art upon reading these embodiments can appreciate. For example, the smart hockey puck can always be processing data, or it can process data upon the triggering of certain events such as detecting motion or detecting a nearby RFID tag. The smart hockey puck can be remotely operated from another wireless computing device or operate on rules associated with time, which could also be considered triggering events. Such rules could include powering down or refusing to log before/after a certain time. Going idle between events after a pre-determined period of time has passed, such as 2, 3, 5, or 10 seconds or longer has passed.

Figure 3A:
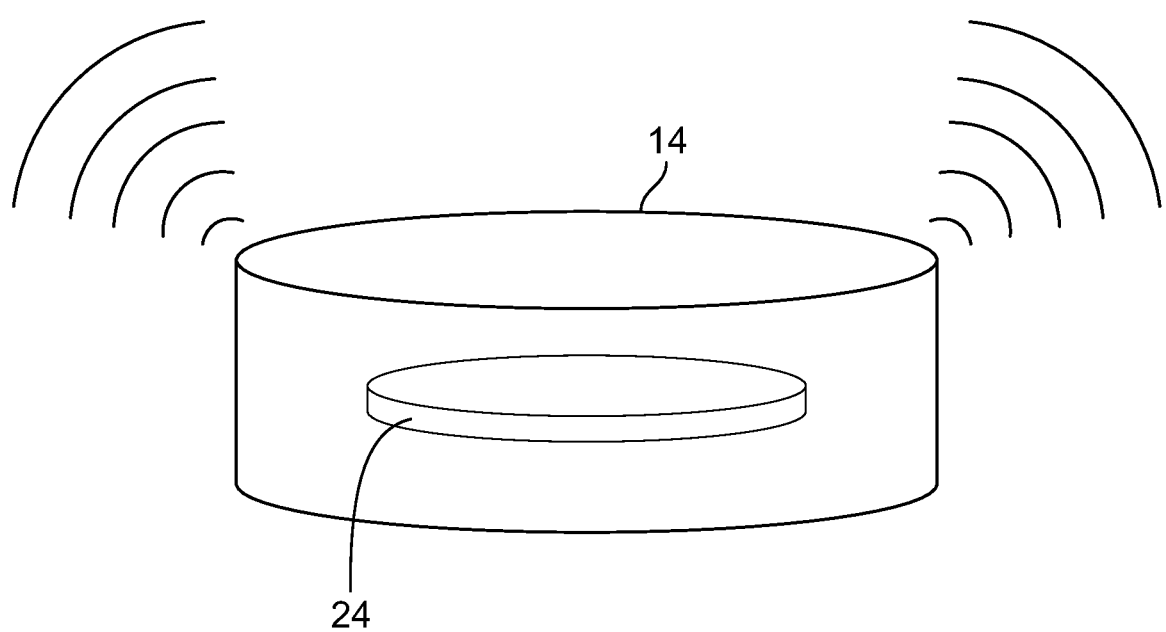
FIGS. 3A-B illustrates a smart hockey puck with embedded electronic board, sensors, antenna, and transceivers for detecting, processing information associated with said puck and surrounding objects.
Figure 3B:
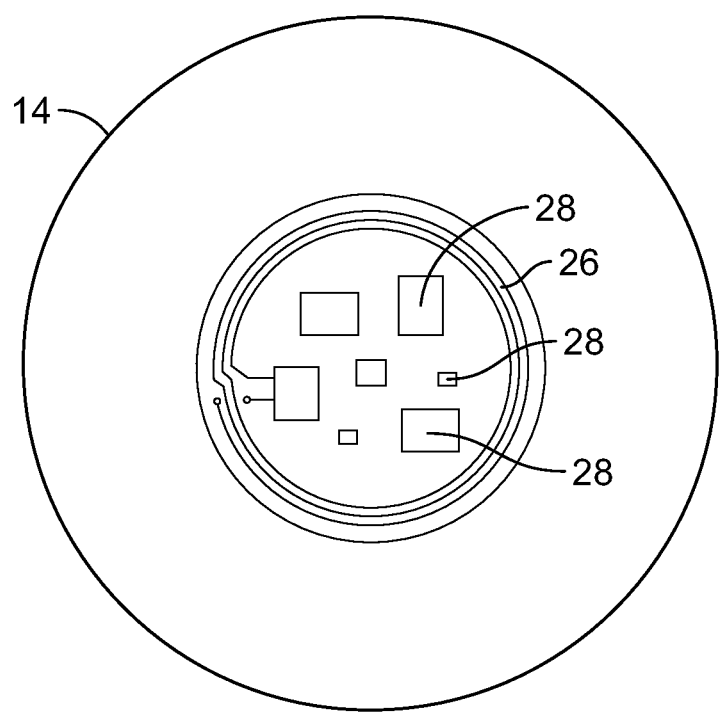

FIGS. 3A-B illustrate the smart hockey puck with an embedded electronics board 24 disposed inside thereof. The electronics board 24 can include an RFID antenna 26 and various electronic components 28. The antenna 26 as shown, is in a circular pattern, which enables for omnidirectional signals to be emitted and received. The electronic components 28 can include: batteries, accelerometers, wireless transceivers ((i.e. Bluetooth, BLE, RFID, NFC, GPS), gyroscope sensors, magnetometer sensors, IMUs, processing chips, microcontrollers, memory, charging ICs, magnets, and other various components to enable the intercommunication and functionality between the various sensors, processing and memory components, power conditioning and charging, as well as transmitting and receiving information to and from the smart hockey puck.

Figure 3C:
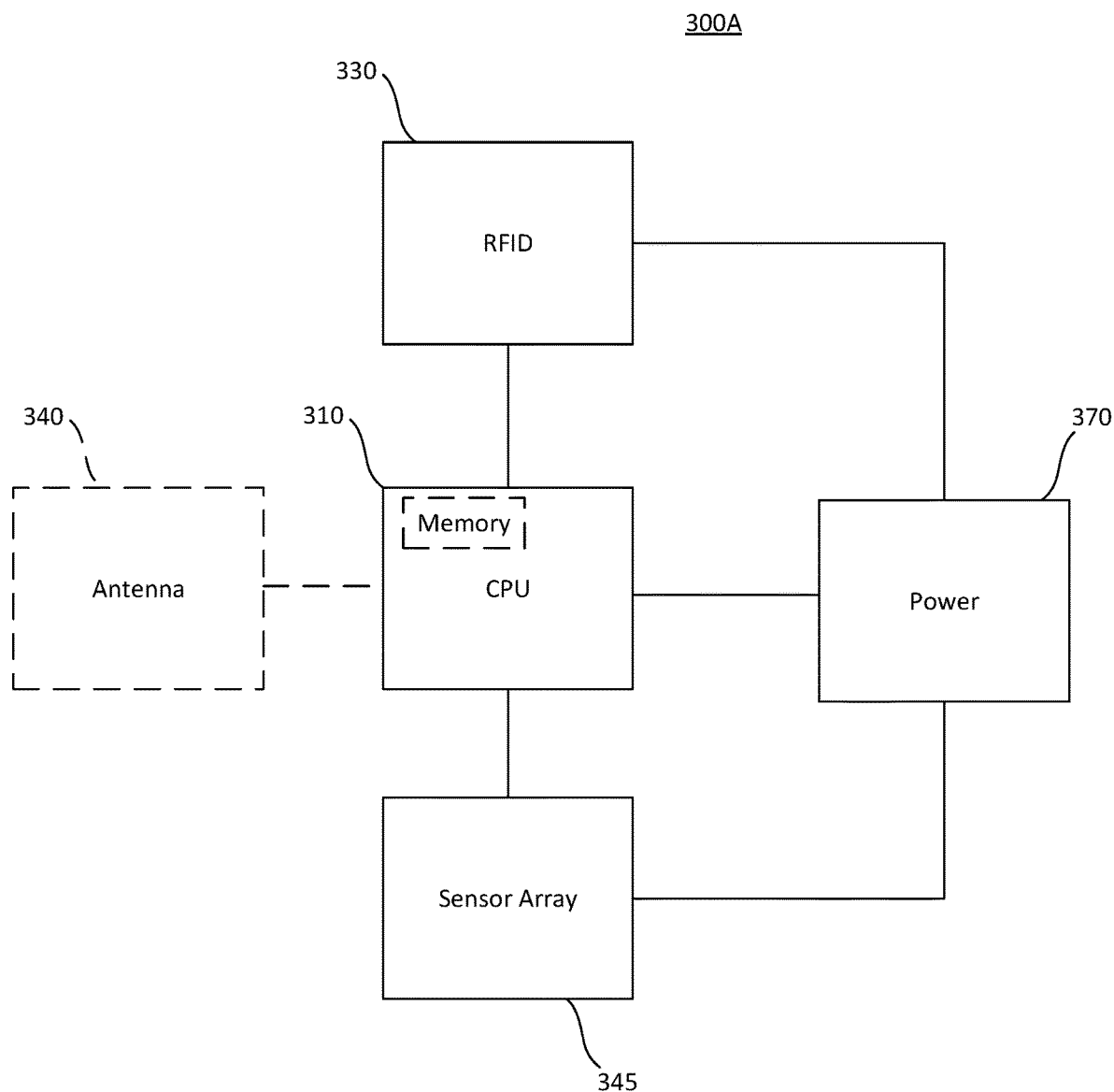
FIGS. 3C-D illustrates a block diagram of the embedded electronic board of FIGS. 3A-B.

FIG. 3C illustrates one embodiment of a block diagram 300A of the electronics board 24, which includes CPU 310 having internal memory, RFID block 330 (including an RFID interface), sensor array 345, power management block 370, and optional antenna 340. In the configuration with the optional antenna, information received by the sensor array and RFID block could be recorded to memory in CPU 310 and later transmitted via the antenna of the RFID block 330. Power can be supplied to the sensor array 345, CPU 310 and RFID block 330.

Figure 3D:
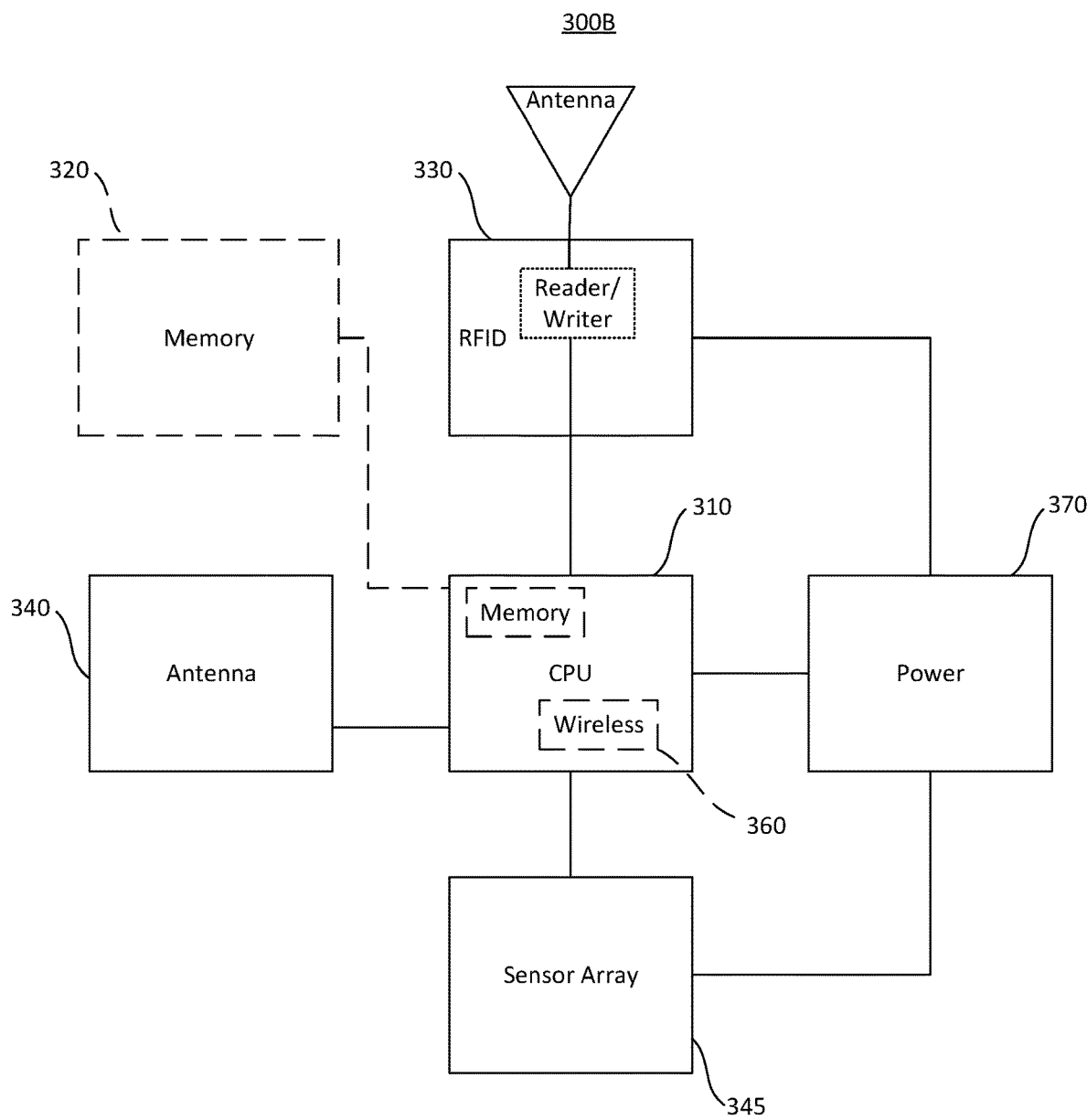

FIG. 3D illustrates another embodiment of a block diagram 300B of the electronics board 24. Block diagram 300B includes a CPU or processor 310 having internal memory, and an optional separate memory 320 unit which can communicate with CPU 310, which receives power from the power management block 370, receives data from sensor array 345 and is connected with antenna 340, as well as RFID block 330, which can include reader and/or writer functions and an antenna. Antenna 340 can be used to communicate with computing device 16 directly. As discussed above in the electronic components 28 the sensors in the sensor array 345 can include many of the same types of sensors including motion sensors (i.e. MEMS) and temperature sensors. The number of sensors is not limited to one or two, but can be as many as desired and the lists provided are meant to be exemplary and not exhaustive. The wireless block 360 can be integrated into the CPU 310, which includes hardware and firmware protocols to allow various types of wireless communication including Bluetooth and Wi-Fi. Thus, enabling the smart hockey puck to communicate to an external computing device 16 or even the cloud server 18. The power management block 370 can include a power source, such as a battery, power management controls and charging controls for both conductive and wireless charging.

It should be noted that the embodiments herein can utilize both wireless charging and DC charging, where the conductive portions (not shown) are formed on an outer surface of the smart hockey puck, or a port (not shown) is formed for a wired charging method.

Figure 4A:
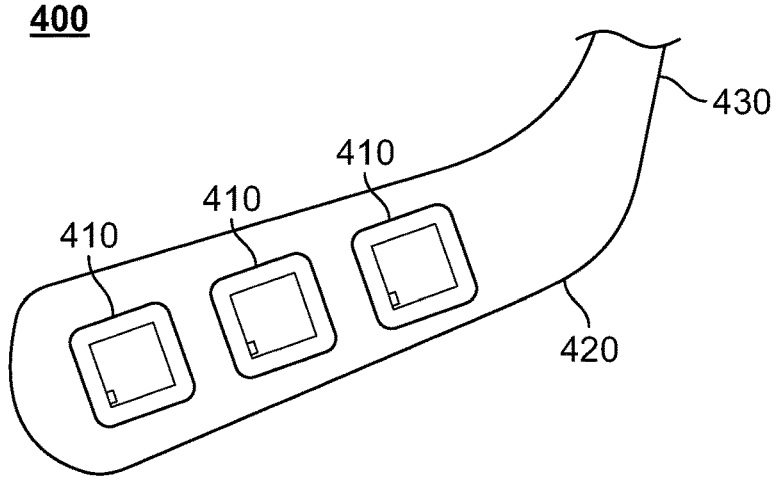
FIGS. 4A-C illustrate the arrangement of RFID tags across the blade portion of a hockey stick.
Figure 4B:
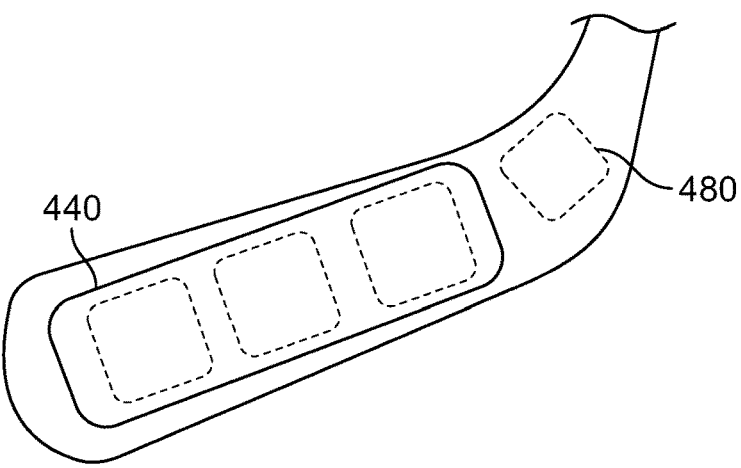
Figure 4C:
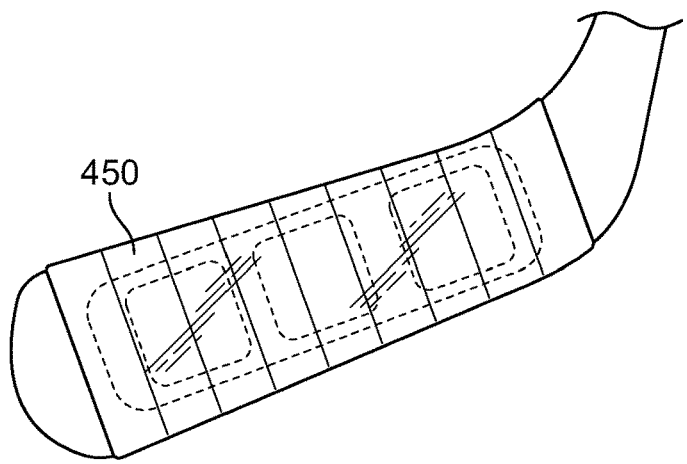

FIGS. 4A-C illustrate an arrangement 400 of RFID tags 410 across the blade portion 420 of a hockey stick 430. In FIG. 4A three RFID tags 410 are spaced across the surface of hockey blade portion 420. As the smart hockey puck approaches and gets within proximity it can read one or more of the RFID tags 410. In some embodiments, the signal strength (as well as which RFID tags) were read can determine which portion of the hockey blade the hockey puck made contact with. This kind of information can help with training purposes. FIG. 4B illustrates an adhesive-backed label 440 or sticker with integrated RFID tags to help them stay in place and provide a protective covering for the RFID tags 410. Traditional hockey tape 450 can be wrapped around the blade portion 420 and cover the adhesive cover 440. It should be noted the RFID tags 410 can be of several varieties including passive, battery-assisted passive and active, which include transponders and beacons. The frequencies that these RFID tags operate include low frequency (LF), high frequency (HF) and ultra-high frequency (UHF). The limitations and uses of each type are understood by those in the art. The embodiments described herein can utilize the various types as well. For example, if the RFID tag is an active transponder, then the smart hockey puck can operate in a read mode. If the RFID tag is a passive version, then the smart hockey puck can emit a signal that powers the RFID tag in order to send a response that is then received by the smart hockey puck.

An identification tag 480 can be placed at various positions on the hockey stick 430 including part of the adhesive-backed label or sticker 440. The identification tag could be a barcode, QR code, alphanumeric code, wireless transmitter and so forth. The purpose of the identification code is to provide a means for quickly identifying a given hockey stick with a player or rather player profile. For example, a player profile can be created and viewed on computing device 16, which could have a QR code reader. The computing device 16, such as a smartphone or tablet, could be used to scan the QR code where the information associated with that QR code, such as the information associated with each of the RFID tags, can now be input into the player profile. As that player uses that hockey stick and interacts with a smart hockey puck, the system can then match the appropriate data with the player's profile. In this manner, a hockey stick could be used by multiple players and the information sorted by scanning the QR code before each player uses the hockey stick. It should readily be recognized from this example how other types of identification tags could be used in a similar manner to achieve the same purpose, which is to associate the correct information with the appropriate player or player profile.

For clarity it should also be understood that a hockey stick associated with a particular hockey player could interact with multiple smart hockey pucks. Thus, data associated with multiple smart hockey pucks could be received into the particular hockey player's profile for viewing and analysis. For example, a training scenario could exist where the particular hockey player is practicing slapshots on goal, and hits 30-40 smart hockey pucks at the goal. The data from each of these smart hockey pucks would be associated with the particular hockey player using the same hockey stick and received into the player profile.

Figure 5A:
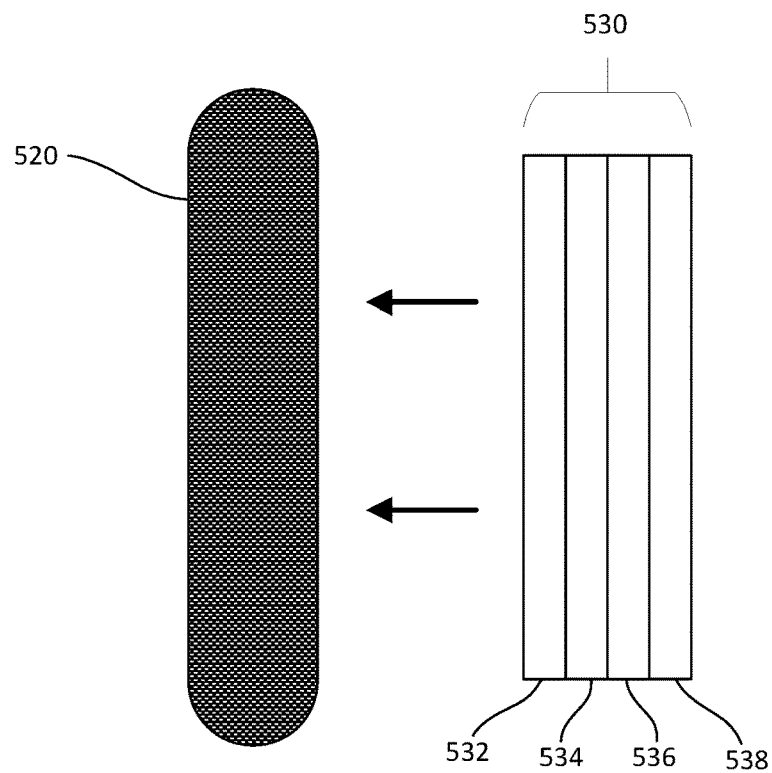
Figure 5B:
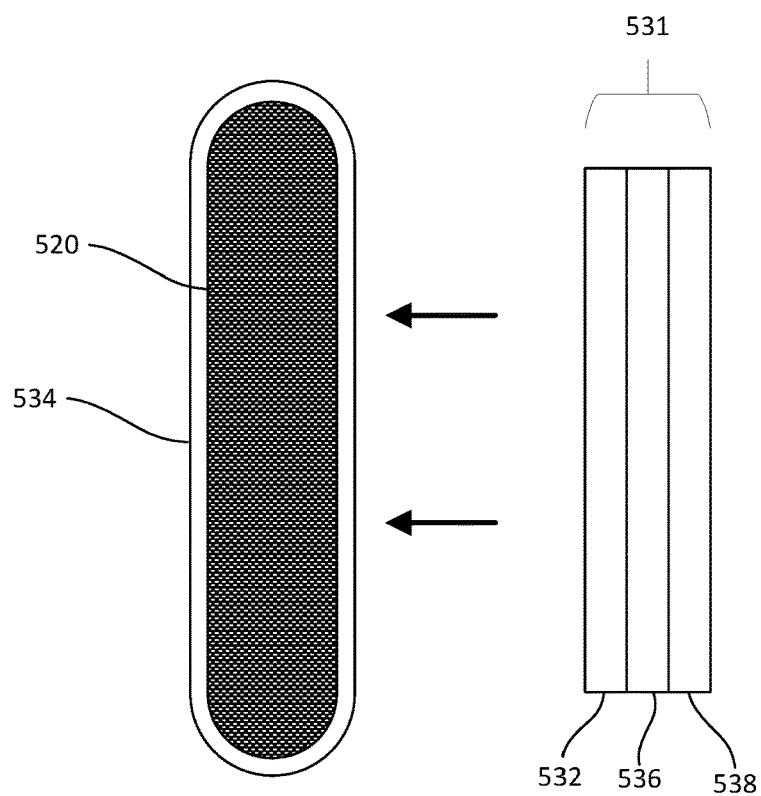

FIGS. 5A-D are illustrations of additional embodiments of attaching and/or embedding RFID tags onto a hockey stick. For example, as shown in FIG. 5A, a cross-sectional view of hockey blade portion 520 is shown and a multi-layered label 530 comprised of adhesive layer 532, ferrite layer 534, RFID inlay layer 536, and cover or padding layer 538. The multi-layer label 530 can be attached to one or both the front and back portions of the hockey blade. A slightly different configuration is shown in FIG. 5B where a ferrite layer is coated around the hockey blade portion 520 leaving the multi-layer label 531 with three layers: adhesive layer 532, RFID inlay layer 536, and the cover or padding layer 538. In yet another embodiment, shown in FIG. 5C, the RFID inlay 536 is disposed or embedded in the hockey blade portion 540. It should be noted the RFID inlay includes an antenna and integrated circuit (IC). A variant to this is found in FIG. 5D where an RFID IC 560 is embedded in a hockey blade portion 550 and where hockey blade portion 550 is formed of a material(s) configured to act as an antenna for the RFID IC 560.

Hockey stick and blades in particular, can be made from a variety of materials. One type of material used could be certain blends of carbon fiber. Certain types of Carbon Fiber can be very conductive and as a result cause interference with RFID tags. For this reason, it may be necessary to provide a ferrite layer, so as to minimize the interference from the blade material, so that the RFID tag(s) placed thereon can receive and transmit optimally. This interference can come in the form of radiation absorption, electrical conductivity, electromagnetic field interference and so forth. Though embodiments shown in FIGS. 5A-D could also be modified with these principles in mind to include additional adhesive layers, additional layers configured to optimally assist with receiving and directing signals, additional protective layers to for the critical components, such as the RFID IC, antenna or power source, and additional cover layers for aesthetic purposes. Other materials used include wood, laminates, epoxy, Kevlar, plastics, and so forth, with each type of material having its own set of insulative or conductive properties, thus the need for a multi-layered label 530, 531, or other version to be optimized accordingly.

Figure 6A:
FIGS. 6A-E illustrate a hockey player utilizing a hockey stick with RFID tags and a smart hockey puck, with detection and analysis being monitored and processed at various positions.
Figure 6B:
Figure 6C:
Figure 6D:
Figure 6E:

FIGS. 6A-E illustrate a hockey player 630 utilizing a smart hockey system 600 including a hockey stick 610 with RFID tag(s) and a smart hockey puck 620. Where the system 600 is configured to process and analyze the smart hockey puck 620 at various positions and in relationship to the hockey stick 610. In FIG. 6A, the smart hockey puck is traveling towards the hockey player 630. The speed, direction and angle of this can be recorded by the smart hockey puck. In FIG. 6B the smart hockey puck comes into contact or close proximity of the hockey stick 610, such that the smart hockey puck 620 can read the RFID tag(s) associated with hockey stick 610. Prior or future data processed from the sensors associated with smart hockey puck 620 can be processed and associated with the information associated with the RFID tag(s) of hockey stick 610, such as the player stopping the puck. FIG. 6C illustrates the hockey player 630 winding up to hit the smart hockey puck. FIG. 6D illustrates the hockey player 630 striking the smart hockey puck with hockey stick 610 where impact information can be processed along with the information shown in FIG. 6E where the smart hockey puck is sent in a new direction, at a new speed and angle.

One of the ways to associate the RFID tags with a player is to input into a player profile the information associated with each of the RFID tags. For example, a QR code could be placed on the hockey stick and have information associated with respect to each of the RFID tags. The QR code could be scanned and that information imported into the player's profile.

Figure 7A:
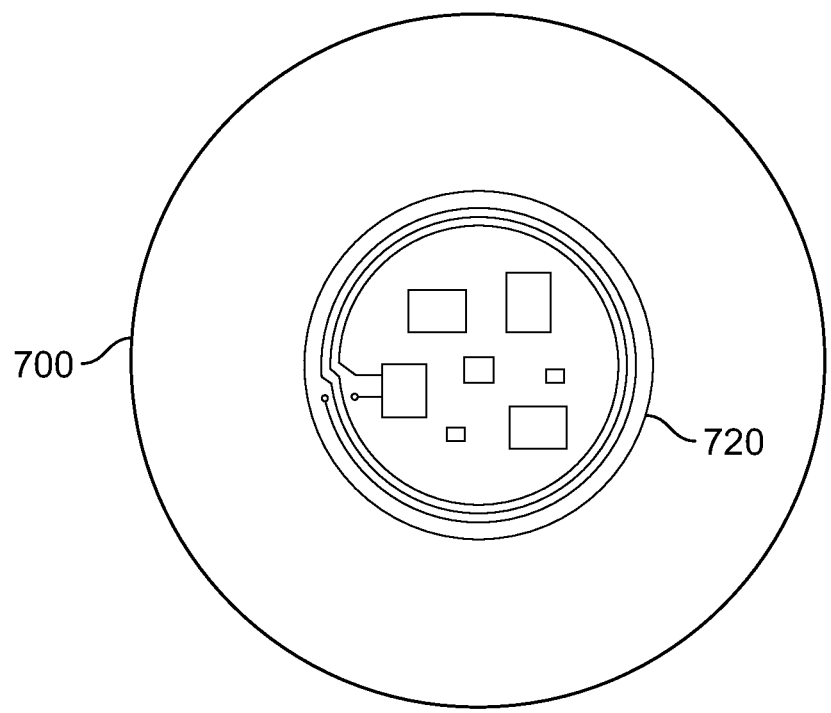
FIGS. 7A-B illustrate a ball with embedded electronics for use in other sports such as field hockey or lacrosse.
Figure 7B:
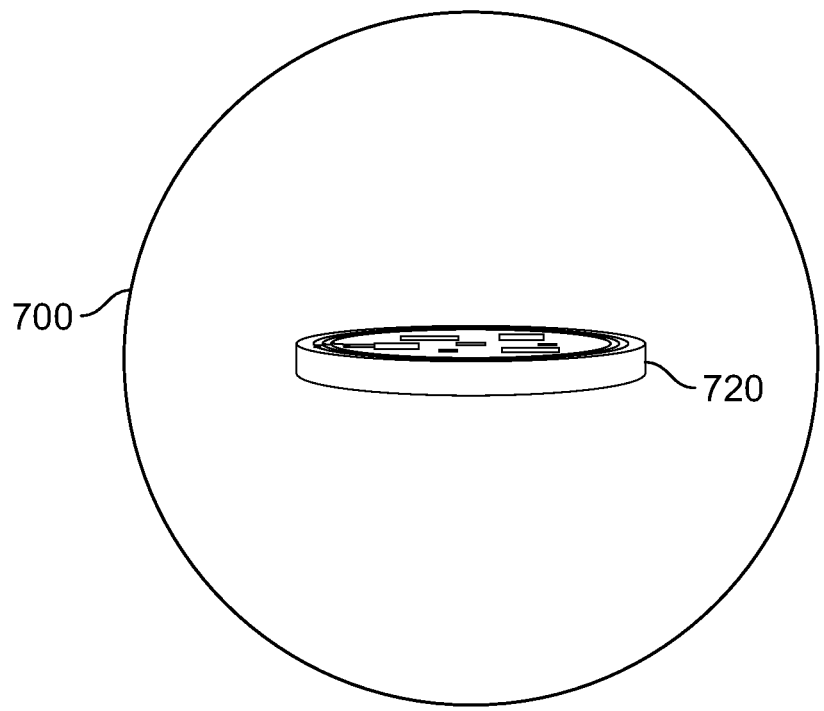
Figure 8:
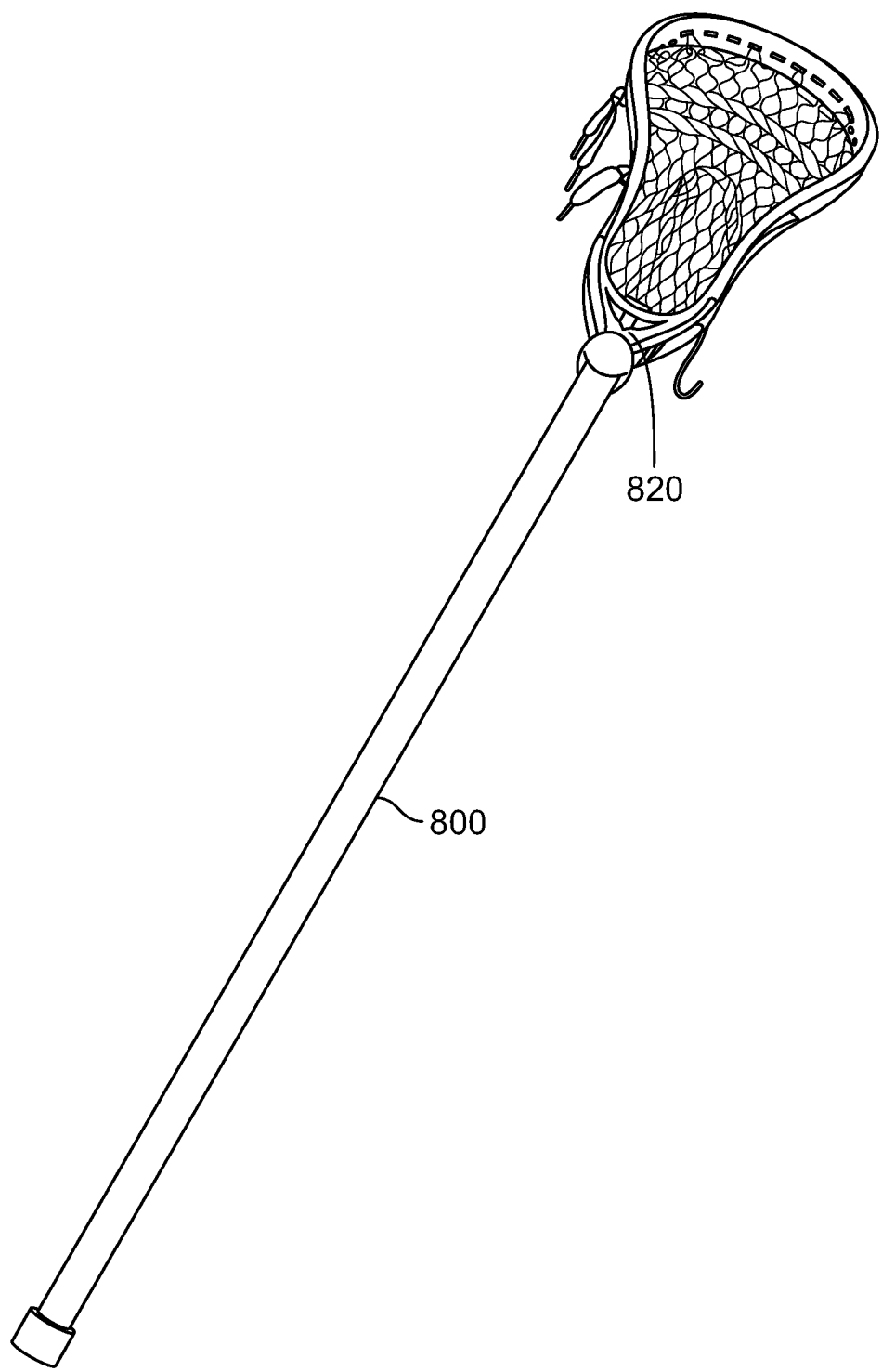
FIG. 8 illustrates a lacrosse stick with an embedded RFID tag for registration with the smart ball of FIGS. 7A-B.

The above examples and embodiments have primarily dealt with the sport of ice hockey. However, and as mentioned, the solutions provided herein can be applied to other sports as well. FIGS. 7A-B illustrate various views of a smart ball 700 that has an embedded circuit board 720 provided therein. Similar to above, the embedded circuit board 720 can have a plurality of antennae, sensors, power, microprocessors and so forth as previously discussed. The smart ball 700 can be used with smart lacrosse stick 800 with an associated RFID tag 820 disposed thereon (or alternatively embedded therein). Similar to the hockey example, the smart ball 700 can register the RFID tag 820, which can be associated with player and player profile where processed data can be received from the smart ball entered and analyzed using a computing device and/or a cloud-based or remote server. The smart ball could be used in field hockey, polo, golf, tennis, bowling, and a variety of other sports.

It should also be readily understood that RFID chips, tags, or sensors can be placed in other places. For example, an RFID tag can be placed in the glove of a goalie, on the goal itself, on a player's clothing. Several chips or tags can be placed along the baseline of a rink, stadium or field, and as the puck makes contact or gets close to the baseline boards around the rink information can be read, stored and later transmitted from the puck or ball. Usually the RFID tag(s) are placed in a spot where the ball or puck or going to come in contact with another piece of sports equipment.

As mentioned, the computing device 16 can include a software application that is configured to process and display raw or processed data from the smart hockey puck or smart ball. Some of the information can be received in a pre-processed state based on a particular sensed event. The computing device 16 can be also be in communication either wirelessly or directly networked to a remote server 18, which can be configured to access multiple databases, store additional information, and have additional processing capabilities. In this manner, the computing device 16 can be used as a means to transfer information via network 50 to the remote server 18 for analysis and receive the analyzed information to be displayed to a user via computing device 16.

It will be appreciated that the system 10 can include computer instructions located on a non-transitory computer-readable medium or memory which can be stored locally (on 16 and 24), or remotely (on 18) at a network location. Processing circuitry can then be utilized either locally, remotely, or both to process the sensed data associated with the hockey puck 14 in order to optimize for size, cost and battery life.

It should also be understood that although the preferred embodiments utilize wireless means to communicate data from the smart puck or ball to a computing device, this can be done via a direct connection as well, where ports are integrated into the puck or ball for the purpose of transferring data.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. An intelligent sports system comprising:
   a puck or ball having an electronics board embedded therein, wherein the electronics board includes the following components: a processing unit, a memory, a plurality of sensors for detecting motion along one or more axes, and at least one antenna configured to read RFID tags; and
   a stick or racket having an RFID tag associated therewith, wherein the electronics board of the puck or ball can read information from the RFID tag, and
   wherein the electronics board is configured to have an idle state and an active state, wherein during the idle state only a subset of the components is operating or at least some of the components are operating in a low power mode,
   wherein the electronics board switches from the idle state to the active state when a triggering event is detected,
   wherein during the active state the at least one antenna configured to read RFID tags is activated to scan for RFID tags, and
   upon identifying an RFID tag the electronics board can process motion data associated with the puck or ball to be associated with a user associated with the stick or racket having the scanned RFID tag.

2. The intelligent sports system of claim 1, further comprising a computing device for receiving and displaying the processed data associated with the puck or ball.

3. The intelligent sports system of claim 2, further including a remote or cloud-based server configured to receive, store and process data received from a computing device.

4. The intelligent sports system of claim 1, wherein the electronics board further includes a rechargeable power source.

5. The intelligent sports system of claim 1, wherein the triggering event can be a sudden change in movement of the puck or ball.

6. The intelligent sports system of claim 1, wherein the stick or racket has a plurality of RFID tags associated therewith.

7. The intelligent sports system of claim 6, wherein the stick is a hockey stick and the plurality of RFID tags are disposed along a blade portion of the hockey stick.

8. The intelligent sports system of claim 7, wherein the puck is a hockey puck, and the electronics board is configured to read the plurality of RFID tags.

9. The intelligent sports system of claim 8, wherein the electronics board is further configured to read signal strength of each of the RFID tags along the blade portion of the hockey stick, which can be analyzed to determine the portion of the hockey stick blade the hockey puck made contact with.

10. The intelligent sports system of claim 1, whereupon an event of the puck or ball coming in close proximity with the stick or racket triggers the electronics board embedded in the puck or ball to associate information associated with the RFID tag associated with the stick or racket data with processed motion data of the puck or ball.

11. The intelligent sports system of claim 1, further including a second antenna for transmitting processed motion data wirelessly to a computing device, and wherein the at least one antenna is configured to read information from the RFID tag associated with the stick or racket.

12. The intelligent sports system of claim 1, further including an identification tag disposed on the stick or racket, wherein the identification tag provides information associated with the RFID tag associated with the stick or racket.

13. The intelligent sports system of claim 12, wherein the identification tag is one of a barcode, a QR code, an alpha-numeric code, or a wireless transmitter.

14. The intelligent sports system of claim 13, wherein the identification tag can be scanned by a computing device and associate the information associated with the identification tag with a player profile.

15. The intelligent sports system of claim 1, wherein the motion data sensed includes one or more of direction, velocity, acceleration, angle, height, and impact force.

16. The intelligent sports system of claim 1, wherein the RFID tag is a multi-layered label comprising an adhesive layer, a ferrite layer, a RFID inlay layer, and a cover or padding layer.

17. The intelligent sports system of claim 16, further including an identification tag disposed on the RFID tag, wherein the identification tag provides information associated with the RFID tag.

18. The intelligent sports system of claim 16, further comprising at least two RFID tags, wherein at least one RFID tag is mounted on a front portion of the stick and at least one RFID tag is located on a rear portion of the stick.

19. The intelligent sports system of claim 1, wherein a ferrite layer is coated around a blade portion of the stick and the RFID tag is a multi-layered label comprising an adhesive layer, an RFID inlay layer, and a cover or padding layer.

20. A method for tracking information about a puck or ball having an embedded electronics board therein in an intelligent sports system, that further includes one or more sticks or rackets each having one or more RFID tags positioned about a portion of the stick or rack, the method comprising:
   determining that a triggering event has occurred, using at least one sensor component of the electronics board;
   altering the state of the electronics board from an idle state to an active state based on the triggering event;
   activating an RFID scanning system of the electronics board during the active state, wherein the scanning system is configured to perform a scan and includes at least one antenna;
   retrieving tag data from a scanned RFID tag that is associated with one of the one or more sticks or rackets;
   receiving motion data associated with the puck or ball using one or more sensor components of the electronics board; and
   associating the motion data with a user associated with the stick or racket having the scanned RFID tag, wherein the motion data includes data from a period of time prior to and after retrieving tag data from the scanned RFID tag.

21. The method for tracking information about a puck or ball in an intelligent sports system of claim 20, further including retrieving scanned tag data from a plurality of RFID tags associated with a stick or racket.

22. The method for tracking information about a puck or ball in an intelligent sports system of claim 20, further including the step of setting the electronics board to an idle state until another triggering event is detected.

23. The method for tracking information about a puck or ball in an intelligent sports system of claim 20, wherein detecting a triggering event comprises detecting at least one of: motion, acceleration, impact, and change in direction of the puck or ball.

24. The method for tracking information about a puck or ball in an intelligent sports system of claim 20, wherein the triggering event can include a change in motion, acceleration, impact, direction, such as a pass or shot, or be a timing event, such as a pre-determined time period or time of day.

25. The method for tracking information about a puck or ball in an intelligent sports system of claim 22, wherein setting the electronics board to an idle condition comprises reducing an amount of power consumed by the electronics board.

\* \* \* \* \*